Dec. 20, 1932.  A. G. M. MICHELL  1,891,436
PACKING
Filed Nov. 5, 1929    2 Sheets-Sheet 1

INVENTOR
Anthony G. M. Michell
BY
Marshall & Hawley,
ATTORNEYS

Dec. 20, 1932.  A. G. M. MICHELL  1,891,436
PACKING
Filed Nov. 5, 1929   2 Sheets-Sheet 2

INVENTOR
Anthony G. M. Michell
BY
Marshall & Hawley
ATTORNEYS

Patented Dec. 20, 1932

1,891,436

UNITED STATES PATENT OFFICE

ANTHONY G. M. MICHELL, OF MELBOURNE, AUSTRALIA

PACKING

Application filed November 5, 1929. Serial No. 404,909.

This invention relates to packings and particularly to packings for rotating shafts.

It is well known that the forms of packing which are successfully applied to reciprocating parts are not as a rule satisfactory for packing rotating elements or shafts. Such packing has a tendency to develop undue heat by friction and to cause wear on the packing and shaft due to the fact that the structure does not admit of the maintenance of satisfactory lubrication between the packing and the shaft.

The packing to which the invention relates is applicable to many different types of machines such, for instance, as to centrifugal pumps or other pumps, engines, turbines, and any other machines in which it is necessary to prevent fluid confined under pressure within the machine from escaping at the shaft opening. The packing may be also applied to machines in which the pressure within the machine is less than atmospheric pressure for the purpose of preventing air from entering the machine through the shaft opening. Furthermore, the invention may be utilized in cases in which there is no appreciable excess or deficiency of pressure within the machine as compared with atmospheric pressure, but in which means is necessary for preventing lubricant used in the machine from passing along the shaft in excessive quantities.

The invention has for its salient object to provide a packing for shafts and preferably for rotating shafts that will be fluid tight or approximately fluid tight or will form a fluid tight joint between the rotating shaft and a fixed casing.

Another object of the invention is to provide a packing of the character described, so constructed and arranged as to assist in the maintenance of adequate lubrication between the packing and shaft.

Another object of the invention is to provide a packing of the character described, so constructed and arranged as to assist in the adequate lubrication between the packing and shaft with a minimum quantity of lubricant.

Further objects of the invention will appear from the following specification taken in connection with the drawings, which form a part of this application, and in which Fig. 1 is an end elevation of a packing constructed in accordance with the invention, certain of the parts being removed for the sake of clearness;

The invention briefly described consists of a packing preferably designed for rotating shafts and comprising an annular series of blocks held in contact with the shaft by spring tension. The blocks are so designed that the spring tension will act only on the trailing end of each block, thus permitting a thin wedge shaped film of lubricant between the shaft and each block. Means is provided for pressing the annular series of blocks against a fixed portion of the casing within which the shaft rotates, thus preventing the escape of lubricant therefrom. It is desirable to provide a plurality of series of blocks, the blocks of each series being overlapped and the overlapping portions of the blocks of one series being staggered with relation to the overlapping portions of the blocks of the other series.

Further details of the invention will appear from the following description.

Figure 1:
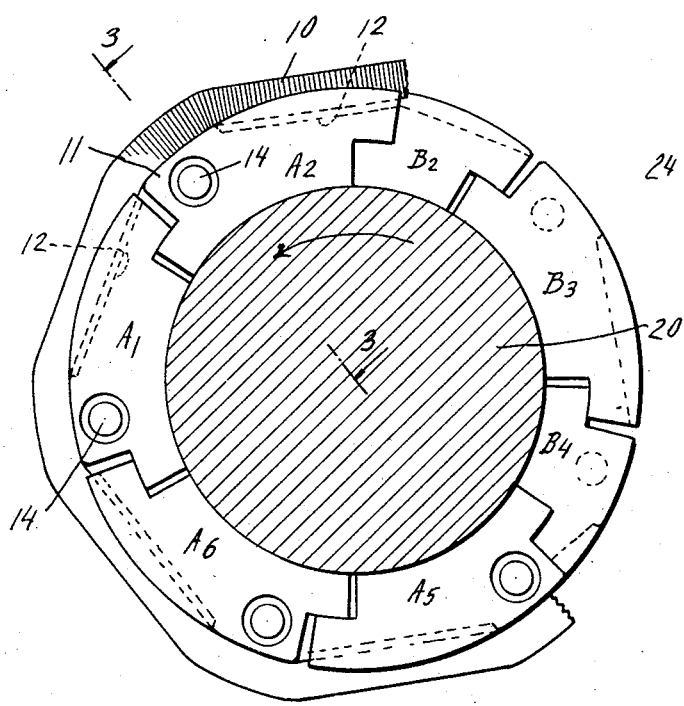
Figure 3:
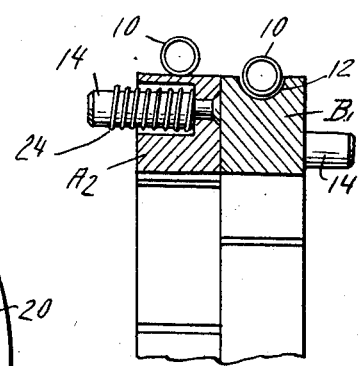
Fig. 3 is a sectional elevation taken substantially on line 3—3 of Fig. 1.
Figure 2:
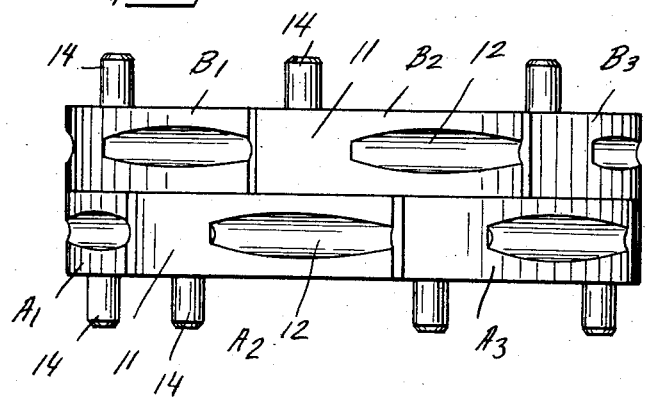
Fig. 2 is a plan view of the construction shown in Fig. 1.

In the embodiment of the invention illustrated in Figs. 1 to 4 inclusive, the packing consists of two annular series of blocks, the blocks being designated on the drawings by the reference characters A1, A2, A3, A4, A5, A6 and B1, B2, B3, B4, B5, B6. The inner surfaces of the blocks are curved to fit the outer periphery or circumference of the shaft. The blocks in each series are stepped or scarfed, each block at one end overlapping the adjacent end of the next succeeding block. From the showing in Fig. 2 it will be seen that the overlapping portions of the blocks in series A are staggered with respect to the overlapping portions of the blocks in series B. In Fig. 1 the blocks A3 and A4 of the series A have been omitted in order to show the block B3 and portions of the blocks B2 and B4 of the series B. It will also be noted that there is a small working clearance or gap between the ends of the overlapping blocks. Each annular series of blocks is held in contact with the shaft by means of an annular spring 10 which, it will be noted, bears only on the trailing end portion 11 of each block. The remaining portion of each block is grooved or cut away, as shown at 12. The spring does not engage the grooved portions of the blocks.

The blocks of both series are exactly alike and any desired number may be used. As above stated, however, the overlapping portions of the blocks of one series are staggered with respect to the overlapping portions of the blocks of the other series. In order to maintain such relative locations or positions of the blocks of the two series, each block is fitted with a pin 14 which extends laterally therefrom and seats in a hole or opening 15 formed in the casing or casing cover.

Figure 4:
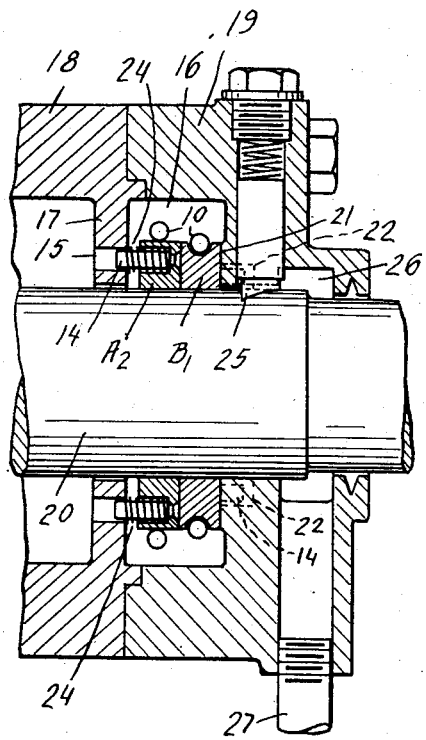
Fig. 4 is a sectional elevation illustrating the packing mounted on a shaft extending through one end of a casing.

In the application of the packing illustrated in Fig. 4, the two series of blocks are arranged in a chamber 16 formed between the end flange 17 of a casing 18 and a cap or cover 19 which is secured to the end of the casing. The flange and cover have openings formed therein to permit the passage of the shaft 20.

The arrangement shown in Fig. 4 is designed particularly for use with a machine within which fluid is contained under pressure. In this embodiment of the invention, therefore, the blocks of the series B are positioned against a flat surface 21 formed on the inside of the cover 19. The pins 14 of this series extend into openings 22 formed in the cover and the pins 14 of the other series A extend into openings 15 formed in the flange 17. Springs 24 surround the pins 14 of the series A and force the two series of blocks outwardly away from the casing, thus forcing the outer flat surfaces of the blocks of series B against the surface 21 of the cover.

With the construction just described it will be evident that the fluid under pressure in the casing 18 will also fill the chamber 16 and assist the springs 24 in holding the blocks in a position to force the blocks of the series B against the surface 21 of the cover. Furthermore, the pressure in the chamber 16 will tend to assist the annular springs 10 in forcing the blocks against or into contact with the shaft. The escape of fluid, except in such small quantities as is necessary for lubrication, will be prevented by the packing above described.

In order to prevent the waste of the small quantity of fluid which escapes, an oil scraper 25 of any well known suitable construction may be provided. The scraper will divert the fluid into the chamber 26 formed in the outer end of the cover, from which it is drained through a pipe 27.

It will be obvious that when the packing is used to seal a casing having a pressure therein less than atmospheric pressure, the springs 24 will engage the other series B of blocks, thus forcing the blocks of the series A against the outer surface of the flange 17.

Figure 5:
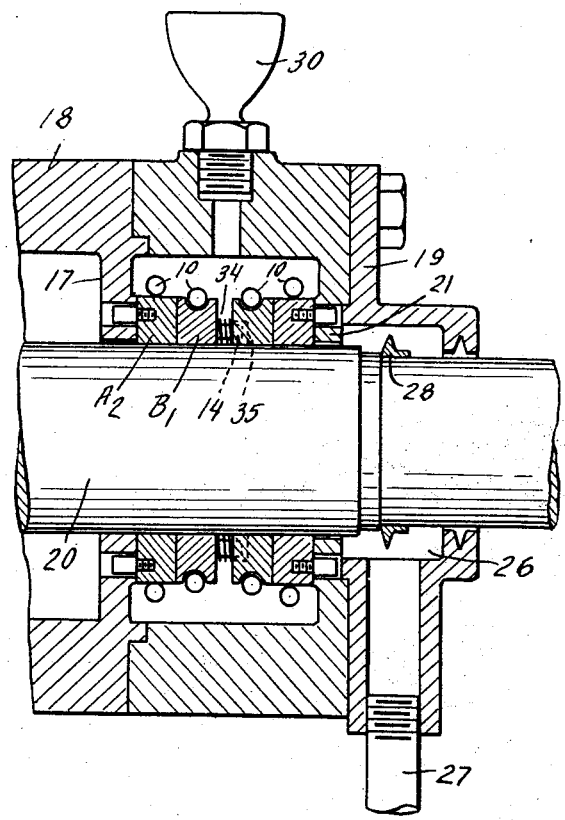
Fig. 5 is a sectional elevation similar to Fig. 4 but showing a slightly different arrangement of the packing elements.

In certain cases it happens that the pressure in a casing will vary from a pressure greater than atmospheric pressure to a partial vacuum or a pressure less than atmospheric pressure. In order to effectively seal a casing having these characteristics and to prevent any undue escape of fluid therefrom, a packing may be arranged as illustrated in Fig. 5. In this figure both series of blocks are duplicated and springs 34 are arranged between the two inner sets of blocks. These springs will cause the blocks on both sides thereof to be forced laterally, the inner series being forced against the outer surface of the flange 17 of the casing 18, and the outer set being forced against the inner surface 21 of the cover 19. The springs 34 are mounted on pins 14 carried by the blocks of the inner series B which extend into openings 35 formed in the blocks of the outer series A. This, of course, may be reversed, if desired, and the pins may be formed on the blocks of the outer series A and extend into openings formed in the blocks of the inner series B. The chamber 26 may be drained through an outlet pipe 27, as in Fig. 4, and an oil thrower 28 is shown on the shaft 20 to assist in discharging excess lubricant. If desired, the packings may be lubricated in any suitable manner, as from a lubricant cup 30 carried by the casing 18. Lubricant so supplied to the chamber 16 can gain access to the shaft through the space between the series A and the flange 17 in Fig. 4 or between the outer series B and the outer series A in Fig. 5. Thus the surfaces of the blocks in contact with the shaft will be lubricated since the pressure of the springs is applied to the trailing ends of the blocks, the leading ends being permitted to rise slightly from direct contact with the shaft so as to form a thin wedge shaped film of lubricant between the block and the shaft.

From the foregoing description it will be clear that simple, practical and effective packing means has been provided for preventing the escape of fluid from casings around the shaft opening through the casing wall.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. Packing for rotating shafts comprising an annular series of segmental, overlapping blocks adapted to engage the shaft, and resilient means engaging an end portion only of each block to force said portion into contact with the shaft.

2. Packing for rotating shafts comprising a plurality of series of segmental blocks adapted to engage the shaft, each block of each series being disposed in overlapping relation to the adjacent blocks, resilient means, engaging said blocks at the trailing ends only, for holding said blocks in contact with the shaft, and means for retaining the packing against rotation with the shaft.

3. Packing for rotating shafts comprising an annular series of segmental blocks adapted to engage the shaft, each block having its trailing end projecting radially outwardly beyond the remaining portion of the block, and resilient means engaging said outwardly projecting portion of each block to force said portion into close contact with the shaft.

4. Packing for rotating shafts comprising an annular series of segmental blocks adapted to engage the shaft, each block having an outwardly projecting portion at the trailing end thereof in the direction of rotation of the shaft and having the remaining portion recessed, and an annular spring encircling the segmental blocks and engaging the projecting portions only thereof.

ANTHONY G. M. MICHELL.